(12) United States Patent
Sikchi et al.

(10) Patent No.: US 7,370,066 B1
(45) Date of Patent: May 6, 2008

(54) SYSTEM AND METHOD FOR OFFLINE EDITING OF DATA FILES

(75) Inventors: Prakash Sikchi, Issaquah, WA (US); Arungundram Narendran, Bellevue, WA (US); Kelvin S. Yiu, Seattle, WA (US); Dragos Barac, Bellevue, WA (US); Miladin Pavlicic, Sammamish, WA (US); Rajesh K. Jha, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 457 days.

(21) Appl. No.: 10/395,490

(22) Filed: Mar. 24, 2003

(51) Int. Cl.
*G06F 17/30* (2006.01)
(52) U.S. Cl. .......................... 707/200; 707/1
(58) Field of Classification Search ................ 707/1–2, 707/100–104.1, 4, 200; 717/100, 101, 121
See application file for complete search history.

(56) References Cited

U.S. PATENT DOCUMENTS

| | | | |
|---|---|---|---|
| 4,201,978 A | 5/1980 | Nally | ......................... 382/140 |
| 4,498,147 A | 2/1985 | Agnew et al. | |
| 4,514,800 A | 4/1985 | Gruner et al. | |
| 4,564,752 A | 1/1986 | Lepic et al. | ................. 235/437 |
| 4,641,274 A | 2/1987 | Swank | |
| 4,674,040 A | 6/1987 | Barker et al. | |
| 4,723,211 A | 2/1988 | Barker et al. | |
| 4,739,477 A | 4/1988 | Barker et al. | |
| 4,815,029 A | 3/1989 | Barker et al. | |
| 4,847,749 A * | 7/1989 | Collins et al. | .................. 714/6 |
| 4,910,663 A | 3/1990 | Bailey | |
| 4,933,880 A | 6/1990 | Borgendale et al. | |
| 4,962,475 A | 10/1990 | Hernandez et al. | |
| 5,025,484 A | 6/1991 | Yamanari et al. | ........... 382/437 |
| 5,072,412 A | 12/1991 | Henderson, Jr. et al. | |
| 5,179,703 A | 1/1993 | Evans | |
| 5,182,709 A | 1/1993 | Makus | |
| 5,187,786 A | 2/1993 | Densmore et al. | |
| 5,191,645 A | 3/1993 | Carlucci et al. | |
| 5,195,183 A | 3/1993 | Miller et al. | |
| 5,204,947 A | 4/1993 | Bernstein et al. | |
| 5,206,951 A | 4/1993 | Khoyi et al. | |
| 5,218,672 A * | 6/1993 | Morgan et al. | ............. 345/501 |
| 5,222,160 A | 6/1993 | Sakai et al. | .................. 382/185 |
| 5,228,100 A | 7/1993 | Takeda et al. | .............. 382/175 |
| 5,237,680 A | 8/1993 | Adams et al. | |

(Continued)

FOREIGN PATENT DOCUMENTS

EP          0 841 615 A2        5/1998

(Continued)

OTHER PUBLICATIONS

OMG XML Metadata Interchange (XMI) Specification Version 1.2 Jan. 2002.

(Continued)

*Primary Examiner*—Cheryl Lewis (57) ABSTRACT

A system and method that enables a user to edit a data file offline is described. This system and method can enable a user to edit a data file without the user having to discover or deploy a solution application governing the data file. For security, this system and method can deploy a solution application within a sandbox, thereby limiting the operations the solution application can perform.

10 Claims, 5 Drawing Sheets

U.S. PATENT DOCUMENTS

| | | |
|---|---|---|
| 5,249,275 A | 9/1993 | Srivastava |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffeman et al. |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. ............. 382/311 |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,555,325 A | 9/1996 | Burger ...................... 382/309 |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,602,996 A | 2/1997 | Powers, III et al. |
| 5,608,720 A | 3/1997 | Biegel et al. |
| 5,625,783 A | 4/1997 | Ezekiel et al. |
| 5,627,979 A | 5/1997 | Chang et al. |
| 5,630,126 A | 5/1997 | Redpath |
| 5,634,121 A | 5/1997 | Tracz et al. |
| 5,640,544 A | 6/1997 | Onodera et al. |
| 5,644,738 A | 7/1997 | Goldman et al. |
| 5,649,099 A | 7/1997 | Theimer et al. |
| 5,659,729 A | 8/1997 | Nielsen |
| 5,664,178 A | 9/1997 | Sinofsky |
| 5,669,005 A | 9/1997 | Curbow et al. |
| 5,682,536 A | 10/1997 | Atkinson et al. |
| 5,689,667 A | 11/1997 | Kurtenbach |
| 5,689,703 A | 11/1997 | Atkinson et al. |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,748,807 A | 5/1998 | Lopresti et al. ............. 382/310 |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,790,796 A | 8/1998 | Sadowsky |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,854,630 A | 12/1998 | Nielsen |
| 5,859,973 A | 1/1999 | Carpenter et al. |
| 5,862,372 A | 1/1999 | Morris et al. |
| 5,864,819 A | 1/1999 | De Armas et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,922,072 A | 7/1999 | Hutchinson et al. |
| 5,929,858 A * | 7/1999 | Shibata et al. ............... 345/418 |
| 5,940,075 A | 8/1999 | Mutschler, III et al. |
| 5,950,010 A | 9/1999 | Hesse et al. |
| 5,956,481 A * | 9/1999 | Walsh et al. ................... 726/23 |
| 5,960,199 A | 9/1999 | Brodsky et al. |
| 5,963,964 A | 10/1999 | Nielsen |
| 5,974,454 A | 10/1999 | Apfel et al. |
| 5,982,370 A | 11/1999 | Kamper |
| 5,987,480 A | 11/1999 | Donohue et al. |
| 5,991,710 A | 11/1999 | Papineni et al. |
| 5,991,877 A | 11/1999 | Luckenbaugh |
| 5,995,103 A | 11/1999 | Ashe |
| 5,999,740 A | 12/1999 | Rowley |
| 6,005,570 A | 12/1999 | Gayraud et al. |
| 6,014,135 A | 1/2000 | Fernandes |
| 6,016,520 A | 1/2000 | Facq et al. |
| 6,018,743 A | 1/2000 | Xu |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A | 3/2000 | Dauerer et al. |
| 6,044,205 A | 3/2000 | Reed et al. |
| 6,052,531 A | 4/2000 | Waldin et al. |
| 6,052,710 A | 4/2000 | Saliba et al. |
| 6,054,987 A | 4/2000 | Richardson |
| 6,072,870 A | 6/2000 | Nguyen et al. |
| 6,078,326 A | 6/2000 | Kilmer et al. |
| 6,078,327 A | 6/2000 | Liman et al. |
| 6,078,924 A | 6/2000 | Ainsbury et al. |
| 6,081,610 A | 6/2000 | Dwork et al. |
| 6,084,585 A | 7/2000 | Kraft et al. |
| 6,088,708 A | 7/2000 | Burch et al. |
| 6,091,417 A | 7/2000 | Lefkowitz |
| 6,094,657 A | 7/2000 | Hailpern et al. |
| 6,097,382 A | 8/2000 | Rosen et al. |
| 6,098,081 A | 8/2000 | Heidorn et al. |
| 6,108,637 A | 8/2000 | Blumenau |
| 6,108,783 A | 8/2000 | Krawczyk et al. |
| 6,115,646 A | 9/2000 | Fiszman et al. |
| 6,121,965 A | 9/2000 | Kenney et al. |
| 6,122,647 A | 9/2000 | Horowitz et al. |
| 6,144,969 A * | 11/2000 | Inokuchi et al. ............. 707/200 |
| 6,151,624 A | 11/2000 | Teare et al. |
| 6,154,128 A | 11/2000 | Wookey et al. |
| 6,163,772 A | 12/2000 | Kramer et al. |

| | | |
|---|---|---|
| 6,167,521 A | 12/2000 | Smith et al. |
| 6,167,523 A | 12/2000 | Strong |
| 6,182,095 B1 | 1/2001 | Leymaster et al. |
| 6,188,401 B1 | 2/2001 | Peyer |
| 6,192,367 B1* | 2/2001 | Hawley et al. ............. 707/102 |
| 6,195,661 B1 | 2/2001 | Filepp et al. |
| 6,199,204 B1 | 3/2001 | Donohue |
| 6,209,128 B1 | 3/2001 | Gerard et al. |
| 6,216,152 B1 | 4/2001 | Wong et al. |
| 6,219,698 B1 | 4/2001 | Iannucci et al. |
| 6,225,996 B1 | 5/2001 | Gibb et al. |
| 6,235,027 B1 | 5/2001 | Herzon |
| 6,253,366 B1 | 6/2001 | Mutschler, III |
| 6,253,374 B1 | 6/2001 | Dresevic et al. |
| 6,263,313 B1 | 7/2001 | Milsted et al. |
| 6,266,810 B1 | 7/2001 | Tanaka et al. |
| 6,268,852 B1 | 7/2001 | Lindhorst et al. |
| 6,272,506 B1 | 8/2001 | Bell |
| 6,275,227 B1 | 8/2001 | DeStefano |
| 6,275,599 B1 | 8/2001 | Adler et al. |
| 6,281,896 B1 | 8/2001 | Alimpich et al. |
| 6,282,711 B1 | 8/2001 | Halpern et al. |
| 6,286,033 B1 | 9/2001 | Kishinsky et al. |
| 6,292,897 B1 | 9/2001 | Gennaro et al. |
| 6,297,819 B1 | 10/2001 | Furst |
| 6,300,948 B1 | 10/2001 | Geller et al. |
| 6,307,955 B1 | 10/2001 | Zank et al. |
| 6,308,179 B1 | 10/2001 | Petersen et al. |
| 6,311,271 B1 | 10/2001 | Gennaro et al. |
| 6,321,259 B1 | 11/2001 | Ouellette et al. |
| 6,321,334 B1 | 11/2001 | Jerger et al. |
| 6,327,628 B1 | 12/2001 | Anuff et al. |
| 6,331,864 B1 | 12/2001 | Coco et al. |
| 6,342,907 B1 | 1/2002 | Petty et al. |
| 6,343,149 B1 | 1/2002 | Motoiwa ..................... 382/209 |
| 6,343,302 B1 | 1/2002 | Graham |
| 6,345,256 B1 | 2/2002 | Milsted et al. |
| 6,345,278 B1 | 2/2002 | Hitchcock et al. |
| 6,345,361 B1 | 2/2002 | Jerger et al. |
| 6,347,323 B1 | 2/2002 | Garber et al. |
| 6,349,408 B1 | 2/2002 | Smith |
| 6,351,574 B1 | 2/2002 | Yair et al. ..................... 382/321 |
| 6,353,926 B1 | 3/2002 | Parthesarathy et al. |
| 6,356,906 B1 | 3/2002 | Lippert et al. |
| 6,357,038 B1 | 3/2002 | Scouten |
| 6,366,907 B1 | 4/2002 | Fanning et al. |
| 6,366,912 B1 | 4/2002 | Wallent et al. |
| 6,367,013 B1 | 4/2002 | Bisbee et al. |
| 6,369,840 B1 | 4/2002 | Barnett et al. |
| 6,369,841 B1 | 4/2002 | Salomon et al. |
| 6,374,402 B1 | 4/2002 | Schmeidler et al. |
| 6,381,742 B2 | 4/2002 | Forbes et al. |
| 6,381,743 B1 | 4/2002 | Mutschler, III |
| 6,389,434 B1 | 5/2002 | Rivette et al. |
| 6,393,456 B1 | 5/2002 | Ambler et al. |
| 6,396,488 B1 | 5/2002 | Simmons et al. |
| 6,405,221 B1 | 6/2002 | Levine et al. ................ 715/234 |
| 6,408,311 B1 | 6/2002 | Baisley et al. |
| 6,414,700 B1 | 7/2002 | Kurtenbach et al. |
| 6,421,070 B1 | 7/2002 | Ramos et al. |
| 6,421,656 B1 | 7/2002 | Cheng et al. |
| 6,425,125 B1 | 7/2002 | Fries et al. |
| 6,429,885 B1 | 8/2002 | Saib et al. |
| 6,434,563 B1 | 8/2002 | Pasquali et al. |
| 6,434,564 B2 | 8/2002 | Ebert |
| 6,442,563 B1 | 8/2002 | Bacon et al. |
| 6,442,755 B1 | 8/2002 | Lemmons et al. |
| 6,446,110 B1 | 9/2002 | Lection et al. |
| 6,449,617 B1 | 9/2002 | Quinn et al. |
| 6,457,009 B1 | 9/2002 | Bollay |
| 6,460,058 B2 | 10/2002 | Koppolu et al. |
| 6,463,419 B1 | 10/2002 | Kluss |
| 6,470,349 B1 | 10/2002 | Heninger et al. |
| 6,473,800 B1 | 10/2002 | Jerger et al. |
| 6,476,828 B1 | 11/2002 | Burkett et al. |
| 6,476,833 B1 | 11/2002 | Moshfeghi |
| 6,477,544 B1 | 11/2002 | Bolosky et al. |
| 6,480,860 B1 | 11/2002 | Monday |
| 6,487,566 B1 | 11/2002 | Sundaresan |
| 6,490,601 B1 | 12/2002 | Markus et al. |
| 6,493,702 B1 | 12/2002 | Adar et al. |
| 6,501,864 B1 | 12/2002 | Eguchi et al. ............... 382/306 |
| 6,502,101 B1 | 12/2002 | Verprauskus et al. |
| 6,502,103 B1 | 12/2002 | Frey et al. |
| 6,505,230 B1 | 1/2003 | Mohan et al. |
| 6,505,300 B2 | 1/2003 | Chan et al. |
| 6,507,856 B1 | 1/2003 | Chen et al. |
| 6,516,322 B1 | 2/2003 | Meredith |
| 6,519,617 B1 | 2/2003 | Wanderski et al. |
| RE38,070 E | 4/2003 | Spies et al. |
| 6,546,546 B1 | 4/2003 | Van Doorn |
| 6,549,221 B1 | 4/2003 | Brown et al. |
| 6,549,878 B1 | 4/2003 | Lowry et al. |
| 6,549,922 B1* | 4/2003 | Srivastava et al. .......... 707/205 |
| 6,553,402 B1 | 4/2003 | Makarios et al. |
| 6,560,616 B1 | 5/2003 | Garber ....................... 707/203 |
| 6,560,620 B1 | 5/2003 | Ching |
| 6,560,640 B2 | 5/2003 | Smethers |
| 6,563,514 B1 | 5/2003 | Samar |
| 6,571,253 B1 | 5/2003 | Thompson et al. |
| 6,578,144 B1 | 6/2003 | Gennaro et al. |
| 6,581,061 B2 | 6/2003 | Graham |
| 6,584,469 B1 | 6/2003 | Chiang et al. ............... 707/102 |
| 6,584,548 B1 | 6/2003 | Bourne et al. |
| 6,585,778 B1 | 7/2003 | Hind et al. |
| 6,589,290 B1 | 7/2003 | Maxwell et al. |
| 6,598,219 B1 | 7/2003 | Lau |
| 6,603,489 B1 | 8/2003 | Edlund et al. |
| 6,604,099 B1 | 8/2003 | Chung et al. |
| 6,606,606 B2 | 8/2003 | Starr |
| 6,609,200 B2 | 8/2003 | Anderson et al. |
| 6,611,822 B1 | 8/2003 | Beams et al. |
| 6,611,840 B1 | 8/2003 | Baer et al. |
| 6,613,098 B1 | 9/2003 | Sorge et al. |
| 6,615,276 B1 | 9/2003 | Mastriann et al. |
| 6,629,109 B1* | 9/2003 | Koshisaka ................... 707/203 |
| 6,631,357 B1 | 10/2003 | Perkowski |
| 6,631,379 B2 | 10/2003 | Cox |
| 6,631,497 B1 | 10/2003 | Jamshidi et al. |
| 6,631,519 B1 | 10/2003 | Nicholson et al. |
| 6,632,251 B1 | 10/2003 | Rutten et al. |
| 6,635,089 B1 | 10/2003 | Burkett et al. |
| 6,636,845 B2 | 10/2003 | Chau et al. |
| 6,643,633 B2 | 11/2003 | Chau et al. |
| 6,643,652 B2 | 11/2003 | Helgeson et al. |
| 6,643,684 B1 | 11/2003 | Malkin et al. |
| 6,651,217 B1 | 11/2003 | Kennedy et al. |
| 6,654,737 B1* | 11/2003 | Nunez ........................... 707/3 |
| 6,654,932 B1 | 11/2003 | Bahrs et al. |
| 6,658,417 B1* | 12/2003 | Stakutis et al. ............... 707/10 |
| 6,658,622 B1 | 12/2003 | Aiken et al. |
| 6,668,369 B1 | 12/2003 | Krebs et al. |
| 6,671,805 B1 | 12/2003 | Brown et al. |
| 6,678,717 B1 | 1/2004 | Schneider |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,701,486 B1 | 3/2004 | Weber et al. |
| 6,704,906 B1 | 3/2004 | Yankovich et al. |
| 6,711,679 B1 | 3/2004 | Guski et al. |
| 6,720,985 B1 | 4/2004 | Silverbrook et al. |
| 6,725,426 B1 | 4/2004 | Pavlov |
| 6,735,721 B1 | 5/2004 | Morrow et al. |
| 6,748,385 B1 | 6/2004 | Rodkin et al. |
| 6,751,777 B2 | 6/2004 | Bates et al. |

| | | |
|---|---|---|
| 6,754,874 B1 | 6/2004 | Richman |
| 6,757,868 B1 | 6/2004 | Glaser et al. |
| 6,760,723 B2 * | 7/2004 | Oshinsky et al. ............... 707/3 |
| 6,763,343 B1 | 7/2004 | Brooke et al. |
| 6,772,139 B1 | 8/2004 | Smith, III |
| 6,772,165 B2 | 8/2004 | O'Carroll |
| 6,774,926 B1 | 8/2004 | Ellis et al. |
| 6,779,154 B1 | 8/2004 | Nussbaum et al. |
| 6,781,609 B1 | 8/2004 | Barker et al. |
| 6,782,144 B2 | 8/2004 | Bellavita et al. ............ 382/310 |
| 6,799,299 B1 | 9/2004 | Li et al. |
| 6,816,849 B1 | 11/2004 | Halt, Jr. |
| 6,845,380 B2 | 1/2005 | Su et al. |
| 6,845,499 B2 | 1/2005 | Srivastava et al. |
| 6,847,387 B2 | 1/2005 | Roth |
| 6,848,078 B1 * | 1/2005 | Birsan et al. ................ 715/511 |
| 6,871,220 B1 | 3/2005 | Rajan et al. |
| 6,874,130 B1 * | 3/2005 | Baweja et al. ............... 715/805 |
| 6,876,996 B2 | 4/2005 | Czajkowski et al. |
| 6,889,359 B1 | 5/2005 | Conner et al. |
| 6,901,403 B1 | 5/2005 | Bata et al. |
| 6,915,454 B1 | 7/2005 | Moore et al. |
| 6,931,532 B1 | 8/2005 | Davis et al. |
| 6,941,510 B1 | 9/2005 | Ozzie et al. |
| 6,941,511 B1 | 9/2005 | Hind et al. |
| 6,941,521 B2 | 9/2005 | Lin et al. |
| 6,948,133 B2 | 9/2005 | Haley |
| 6,948,135 B1 | 9/2005 | Ruthfield et al. |
| 6,950,980 B1 | 9/2005 | Malcolm |
| 6,961,897 B1 | 11/2005 | Peel, Jr. et al. |
| 6,963,875 B2 | 11/2005 | Moore |
| 6,968,503 B1 | 11/2005 | Chang et al. |
| 6,968,505 B2 | 11/2005 | Stoll et al. |
| 6,993,714 B2 | 1/2006 | Kaler et al. |
| 6,996,776 B1 | 2/2006 | Makely et al. |
| 6,996,781 B1 | 2/2006 | Myers et al. |
| 7,003,722 B2 | 2/2006 | Rothchiller et al. |
| 7,010,580 B1 | 3/2006 | Fu et al. ...................... 709/217 |
| 7,024,417 B1 | 4/2006 | Russakovsky et al. |
| 7,032,170 B2 | 4/2006 | Poulose |
| 7,036,072 B1 | 4/2006 | Sulistio et al. |
| 7,039,875 B2 | 5/2006 | Khalfay et al. |
| 7,051,273 B1 | 5/2006 | Holt et al. |
| 7,058,663 B2 | 6/2006 | Johnston et al. |
| 7,062,764 B2 * | 6/2006 | Cohen et al. ................ 717/171 |
| 7,065,493 B1 | 6/2006 | Homsi |
| 7,080,325 B2 | 7/2006 | Treibach-Heck et al. |
| 7,086,009 B2 | 8/2006 | Resnick et al. |
| 7,086,042 B2 | 8/2006 | Abe et al. .................... 717/143 |
| 7,088,374 B2 | 8/2006 | David et al. |
| 7,103,611 B2 | 9/2006 | Murthy et al. |
| 7,106,888 B1 | 9/2006 | Silverbrook et al. |
| 7,107,282 B1 | 9/2006 | Yalamanchi |
| 7,107,521 B2 | 9/2006 | Santos |
| 7,152,205 B2 | 12/2006 | Day et al. |
| 7,190,376 B1 | 3/2007 | Tonisson |
| 7,191,394 B1 | 3/2007 | Ardeleanu et al. |
| 7,213,200 B2 | 5/2007 | Abe et al. .................... 715/230 |
| 7,281,018 B1 | 10/2007 | Begun et al. |
| 7,296,017 B2 | 11/2007 | Larcheveque et al. ......... 707/6 |
| 2001/0007109 A1 | 7/2001 | Lange |
| 2001/0022592 A1 | 9/2001 | Alimpach et al. |
| 2001/0024195 A1 | 9/2001 | Hayakawa |
| 2001/0037345 A1 | 11/2001 | Kiernan |
| 2001/0054004 A1 | 12/2001 | Powers |
| 2001/0056429 A1 | 12/2001 | Moore et al. |
| 2001/0056460 A1 | 12/2001 | Sahota et al. |
| 2002/0010700 A1 | 1/2002 | Wotring ...................... 707/100 |
| 2002/0010743 A1 | 1/2002 | Ryan et al. |
| 2002/0010746 A1 | 1/2002 | Jilk, Jr. et al. |
| 2002/0013788 A1 | 1/2002 | Pennell et al. |
| 2002/0026441 A1 | 2/2002 | Kutay |
| 2002/0026461 A1 | 2/2002 | Kutay et al. |
| 2002/0032590 A1 | 3/2002 | Anand et al. |
| 2002/0032692 A1 | 3/2002 | Suzuki et al. |
| 2002/0032706 A1 | 3/2002 | Perla et al. |
| 2002/0032768 A1 | 3/2002 | Voskuil |
| 2002/0035579 A1 | 3/2002 | Wang et al. |
| 2002/0035581 A1 | 3/2002 | Reynar et al. |
| 2002/0040469 A1 | 4/2002 | Pramberger |
| 2002/0057297 A1 | 5/2002 | Grimes et al. |
| 2002/0065798 A1 | 5/2002 | Bostleman et al. |
| 2002/0070973 A1 | 6/2002 | Croley |
| 2002/0078074 A1 | 6/2002 | Cho et al. |
| 2002/0078103 A1 | 6/2002 | Gorman et al. |
| 2002/0100027 A1 | 7/2002 | Binding et al. |
| 2002/0112224 A1 | 8/2002 | Cox |
| 2002/0129056 A1 | 9/2002 | Conant |
| 2002/0133484 A1 | 9/2002 | Chau |
| 2002/0152244 A1 | 10/2002 | Dean et al. |
| 2002/0156772 A1 | 10/2002 | Chau |
| 2002/0156846 A1 | 10/2002 | Rawat et al. |
| 2002/0156929 A1 | 10/2002 | Hekmatpour |
| 2002/0169752 A1 | 11/2002 | Kusama et al. |
| 2002/0169789 A1 | 11/2002 | Kutay |
| 2002/0174147 A1 | 11/2002 | Wang et al. |
| 2002/0174417 A1 | 11/2002 | Sijacic et al. |
| 2002/0184219 A1 | 12/2002 | Preisig et al. |
| 2002/0188597 A1 | 12/2002 | Kern et al. |
| 2002/0188613 A1 | 12/2002 | Chakraborty et al. |
| 2002/0194219 A1 | 12/2002 | Bradley et al. |
| 2002/0196281 A1 | 12/2002 | Audleman et al. |
| 2002/0196288 A1 | 12/2002 | Emrani |
| 2002/0198891 A1 | 12/2002 | Li et al. |
| 2002/0198935 A1 | 12/2002 | Crandall, Sr. et al. |
| 2003/0004951 A1 | 1/2003 | Chokshi |
| 2003/0007000 A1 | 1/2003 | Carlson et al. |
| 2003/0014397 A1 | 1/2003 | Chau et al. |
| 2003/0016668 A1 | 1/2003 | Britton et al. |
| 2003/0020746 A1 | 1/2003 | Chen et al. |
| 2003/0023641 A1 | 1/2003 | Gorman et al. |
| 2003/0025732 A1 | 2/2003 | Prichard |
| 2003/0026507 A1 | 2/2003 | Zlotnick ...................... 382/311 |
| 2003/0037303 A1 | 2/2003 | Bodlaender |
| 2003/0043986 A1 | 3/2003 | Creamer |
| 2003/0046665 A1 | 3/2003 | Ilin |
| 2003/0048301 A1 | 3/2003 | Menninger |
| 2003/0051243 A1 | 3/2003 | Lemmons et al. |
| 2003/0055811 A1 | 3/2003 | Stork et al. |
| 2003/0055828 A1 * | 3/2003 | Koch et al. ................... 707/10 |
| 2003/0056198 A1 | 3/2003 | Al-Azzawe |
| 2003/0061386 A1 | 3/2003 | Brown |
| 2003/0061567 A1 | 3/2003 | Brown et al. |
| 2003/0084424 A1 | 5/2003 | Reddy et al. |
| 2003/0093755 A1 | 5/2003 | O'Carroll ..................... 715/500 |
| 2003/0120578 A1 | 6/2003 | Newman |
| 2003/0120651 A1 | 6/2003 | Bernstein et al. |
| 2003/0120659 A1 | 6/2003 | Sridhar |
| 2003/0120671 A1 | 6/2003 | Kim et al. |
| 2003/0120686 A1 | 6/2003 | Kim et al. |
| 2003/0126555 A1 | 7/2003 | Aggarwal et al. |
| 2003/0128196 A1 | 7/2003 | Lapstun et al. |
| 2003/0135825 A1 | 7/2003 | Gertner et al. |
| 2003/0140132 A1 | 7/2003 | Champagne et al. |
| 2003/0158897 A1 | 8/2003 | Ben-Natan et al. |
| 2003/0163285 A1 | 8/2003 | Nakamura et al. ........... 702/179 |
| 2003/0167277 A1 | 9/2003 | Hejlsberg et al. |
| 2003/0182268 A1 | 9/2003 | Lal |
| 2003/0182327 A1 | 9/2003 | Ramanujam et al. |
| 2003/0187756 A1 | 10/2003 | Klivington et al. |
| 2003/0187930 A1 | 10/2003 | Ghaffar et al. |
| 2003/0188260 A1 | 10/2003 | Jensen et al. |
| 2003/0189593 A1 | 10/2003 | Yarvin |
| 2003/0192008 A1 | 10/2003 | Lee |
| 2003/0200506 A1 | 10/2003 | Abe et al. .................... 715/234 |
| 2003/0204511 A1 | 10/2003 | Brundage |

| | | | | | | |
|---|---|---|---|---|---|---|
| 2003/0204814 | A1 | 10/2003 | Elo et al. | 2005/0114757 A1 | 5/2005 | Sahota et al. |
| 2003/0205615 | A1 | 11/2003 | Marappan | 2005/0138086 A1 | 6/2005 | Pecht-Seibert |
| 2003/0212664 | A1 | 11/2003 | Breining et al. | 2005/0171746 A1 | 8/2005 | Thalhammer-Reyero |
| 2003/0217053 | A1 | 11/2003 | Bachman et al. | 2005/0198086 A1 | 9/2005 | Moore |
| 2003/0220930 | A1 | 11/2003 | Milleker et al. ............ 707/100 | 2005/0198247 A1 | 9/2005 | Perry et al. |
| 2003/0225469 | A1 | 12/2003 | DeRemer et al. | 2005/0223063 A1 | 10/2005 | Chang et al. |
| 2003/0225768 | A1 | 12/2003 | Chaudhuri | 2005/0223320 A1 | 10/2005 | Brintzenhofe et al. |
| 2003/0225829 | A1 | 12/2003 | Pena et al. | 2005/0268222 A1 | 12/2005 | Cheng |
| 2003/0226132 | A1 | 12/2003 | Tondreau et al. | 2006/0020586 A1 | 1/2006 | Prompt et al. |
| 2003/0233374 | A1 | 12/2003 | Spinola et al. | 2006/0026534 A1 | 2/2006 | Ruthfield et al. |
| 2003/0236859 | A1 | 12/2003 | Vaschillo et al. | 2006/0031757 A9 | 2/2006 | Vincent, III |
| 2003/0237046 | A1 | 12/2003 | Parker et al. | 2006/0036995 A1 | 2/2006 | Chickles et al. |
| 2003/0237047 | A1 | 12/2003 | Borson | 2006/0041838 A1 | 2/2006 | Khan |
| 2004/0002939 | A1 | 1/2004 | Arora | 2006/0059434 A1 | 3/2006 | Boss et al. |
| 2004/0003031 | A1* | 1/2004 | Brown et al. ............... 709/203 | 2006/0069605 A1 | 3/2006 | Hatoun |
| 2004/0003353 | A1 | 1/2004 | Rivera et al. | 2006/0085409 A1 | 4/2006 | Rys et al. |
| 2004/0003389 | A1* | 1/2004 | Reynar et al. ............. 717/178 | 2006/0143220 A1 | 6/2006 | Spencer |
| 2004/0010752 | A1 | 1/2004 | Chan et al. | 2006/0161559 A1 | 7/2006 | Bordawekar et al. ....... 707/100 |
| 2004/0024842 | A1 | 2/2004 | Witt | 2007/0036433 A1 | 2/2007 | Teutsch |
| 2004/0030991 | A1 | 2/2004 | Hepworth et al. | 2007/0050719 A1 | 3/2007 | Lui et al. |
| 2004/0039990 | A1 | 2/2004 | Bakar et al. | 2007/0061467 A1 | 3/2007 | Essey |
| 2004/0039993 | A1 | 2/2004 | Kougiouris et al. | 2007/0061706 A1 | 3/2007 | Cupala |
| 2004/0044961 | A1 | 3/2004 | Pesenson | 2007/0074106 A1 | 3/2007 | Ardeleanu |
| 2004/0044965 | A1 | 3/2004 | Toyama et al. | 2007/0094589 A1 | 4/2007 | Paoli |
| 2004/0054966 | A1 | 3/2004 | Busch et al. | 2007/0100877 A1 | 5/2007 | Paoli |
| 2004/0059754 | A1 | 3/2004 | Barghout et al. | 2007/0101280 A1 | 5/2007 | Paoli |
| 2004/0073565 | A1 | 4/2004 | Kaufman et al. | 2007/0118803 A1 | 5/2007 | Walker et al. ............. 715/744 |
| 2004/0073868 | A1 | 4/2004 | Easter et al. | 2007/0130504 A1 | 6/2007 | Betancourt et al. ........ 715/236 |
| 2004/0078756 | A1 | 4/2004 | Napper et al. | 2007/0208769 A1 | 9/2007 | Boehm et al. ............. 707/102 |
| 2004/0083426 | A1 | 4/2004 | Sahu | | | |
| 2004/0088647 | A1* | 5/2004 | Miller et al. ................ 715/500 | | | |
| 2004/0093596 | A1* | 5/2004 | Koyano ..................... 717/171 | | | |

FOREIGN PATENT DOCUMENTS

| | | |
|---|---|---|
| EP | 0 961 197 | 12/1999 |
| EP | 1 076 290 A2 | 2/2001 |
| EP | 1221661 | 7/2002 |
| JP | 63085960 | 4/1988 |
| JP | 401173140 A * | 7/1989 |
| JP | 3191429 | 8/1991 |
| JP | 4225466 | 8/1992 |
| JP | 5314152 | 11/1993 |
| JP | 406014105 A * | 1/1994 |
| JP | 6139241 | 5/1994 |
| JP | 6180697 | 6/1994 |
| JP | 6180698 | 6/1994 |
| JP | 02000132436 A * | 5/2000 |
| JP | 02002183652 A * | 6/2002 |
| JP | 02003173288 A * | 6/2003 |
| WO | WO 99/24945 | 5/1999 |
| WO | WO 99/56207 | 11/1999 |
| WO | WO 01/44934 A1 | 6/2001 |
| WO | WO0157720 | 8/2001 |
| WO | WO2001057720 | 9/2006 |

| | | | |
|---|---|---|---|
| 2004/0107367 | A1 | 6/2004 | Kisters |
| 2004/0117769 | A1 | 6/2004 | Lauzon et al. |
| 2004/0123277 | A1 | 6/2004 | Schrader et al. |
| 2004/0146199 | A1 | 7/2004 | Berkner et al. |
| 2004/0163041 | A1 | 8/2004 | Engel |
| 2004/0172442 | A1 | 9/2004 | Ripley |
| 2004/0186762 | A1 | 9/2004 | Beaven et al. |
| 2004/0189716 | A1 | 9/2004 | Paoli et al. |
| 2004/0194035 | A1 | 9/2004 | Chakraborty |
| 2004/0205473 | A1 | 10/2004 | Fisher et al. |
| 2004/0205525 | A1 | 10/2004 | Murren et al. |
| 2004/0205534 | A1 | 10/2004 | Koelle |
| 2004/0205571 | A1 | 10/2004 | Adler |
| 2004/0205592 | A1 | 10/2004 | Huang |
| 2004/0205605 | A1 | 10/2004 | Adler et al. |
| 2004/0205653 | A1 | 10/2004 | Hadfield et al. |
| 2004/0205671 | A1 | 10/2004 | Sukehiro et al. |
| 2004/0221238 | A1 | 11/2004 | Cifra et al. |
| 2004/0221245 | A1 | 11/2004 | Chickles et al. |
| 2004/0237030 | A1 | 11/2004 | Malkin |
| 2004/0261019 | A1 | 12/2004 | Imamura et al. ............. 715/234 |
| 2004/0268229 | A1 | 12/2004 | Paoli et al. |
| 2005/0004893 | A1 | 1/2005 | Sangroniz |
| 2005/0005248 | A1 | 1/2005 | Rockey et al. |
| 2005/0015732 | A1 | 1/2005 | Vedula et al. |
| 2005/0027757 | A1 | 2/2005 | Kiessig et al. |
| 2005/0033728 | A1 | 2/2005 | James ........................ 707/1 |
| 2005/0038711 | A1 | 2/2005 | Marlelo |
| 2005/0055627 | A1 | 3/2005 | Lloyd et al. |
| 2005/0060324 | A1 | 3/2005 | Johnson et al. |
| 2005/0065933 | A1 | 3/2005 | Goering |
| 2005/0065936 | A1 | 3/2005 | Goering |
| 2005/0066287 | A1 | 3/2005 | Tattrie et al. |
| 2005/0071752 | A1 | 3/2005 | Marlatt |
| 2005/0076049 | A1 | 4/2005 | Qubti et al. |
| 2005/0091285 | A1 | 4/2005 | Krishnan et al. |
| 2005/0091305 | A1 | 4/2005 | Lange et al. |
| 2005/0102370 | A1* | 5/2005 | Lin et al. ................... 709/217 |
| 2005/0102612 | A1 | 5/2005 | Allan et al. |
| 2005/0108104 | A1 | 5/2005 | Woo |
| 2005/0108624 | A1 | 5/2005 | Carrier |

OTHER PUBLICATIONS

U.S. Appl. No. 60/191,662, Kutay et al.
U.S. Appl. No. 60/203,081, Ben-Natan et al.
"Store and Organize Related Project Files in a Binder," Getting Results with Microsoft Office, 1990, pp. 109-112.
Barker et al., "Creating In-Line Objects Within An Integrated Editing Environment," IBM Technical Disclosure Bulletin, vol. 27, No. 5, Oct. 1984, p. 2962.
Berg A., "Naming and Binding: Monikers" Inside OLE, 1995, Chapter 9, pp. 431-490.
Clapp D., "The NeXT Application Kit Part I: Non-Responsive Classes," The NeXT Bible 1990, Chapter 16, pp. 275-293.
DiLascia et al., "Sweeper" Microsoft Interactive Developer, vol. 1, No. 1, 1996, 27 pages.
Herzner et al., "CDAM- Compound Document Access and Management. An Object-Oriented Approach" Multimedia Systems Interaction and Applications, 1992, Chapter 3, pp. 17-36.
Kobayashi et al., "An Update on BTRON-specification OS Development" IEEE 1991 pp. 132-140.

Peterson B., "Unix Variants," Unix Review, vol. 10, No. 4, Apr. 1992, pp. 29-31.
Pike et al., "Plan 9 from Bell Labs" UKUUG, Summer 1990, 10 pages.
Pike et al., "The Use of Name Spaces in Plan 9," Operating Systems Review vol. 27, No. 2, Apr. 1993, pp. 72-76.
Staneck W., "Internal and External Media" Electronic Publishing Unleashed, 1995, Chapter 22, pp. 510-542.
Zdonik S., "Object Management System Concepts," ACM, 1984, pp. 13-19.
Trupin J., "The Visual Programmer," Microsoft Systems Journal, Apr. 1996, pp. 103-105.
"Architecture for a Dynamic Information Area Control" IBM Technical Disclosure Bulletin IBM Corp. New York US vol. 37 No. 10 Jan. 10, 1994. pp. 245-246.
Alschuler, Liora, "A tour of Xmetal" O'Reilly XML.COM 'Online Jul. 14, 1999 XP002230081 retrieved from the internet: <URL:http://www.xml.com/pub/a/SeyboldReport/ip0311025. html> retrieved on Feb. 5, 2003.
Au, Irene et al., "Netscape Communicator's Collapsible Toolbars" CHI'98 Human Factors in Computing Systems Conference Proceedings Los Angeles CA Apr. 18-23, 1998 pp. 81-86.
Battle, Steven A. et al., "Flexible Information Presentation with XML" 1998, The Institution of Electrical Engineers, 6 pages.
Brogden, William, "Arbortext Adept 8 Editor Review" O'Reilly XML.COM 'Online! Sep. 22, 1999 XP002230080 retrieved from the Internet <URL:http://www.xml.com/pub/a/1999/09/adept/Adept/Rvw.htm> retrieved on Feb. 5, 2003.
Ciancarini, Paolo et al., "Managing Complex Documents Over the WWW: A Case Study for XML" IEEE Transactions on Knowledge and Data Engineering Vo.l. 11 No. 4 Jul./Aug. 1999, pp. 629-938.
Davidow, Ari, "XML Editors: Allegations of Functionality in search of reality," Internet 'Online! 1999 XP002230082 retrieved from the Internet <URL:http://www.ivritype.com/xml/>.
Kanemoto, Hirotaka et al., "An Efficiently Updatable Index Scheme for Structured Documents" 1998 IEEE, pp. 991-996.
Netscape Communication Corp., "Netscape Communicator 4.61 for OS/2 Warp" Software 1999 The whole software release & "Netscape—Version 4.6 [en]-010615" Netscape Screenhot 2 Oct. 2, 2002.
Sutanthavibul, Supoj et al., "XFIG Version 3.2 Patchlevel 2 (Jul. 2, 1998) Users Manual (Edition 1.0)" Internet Document [Online] Jul. 2, 1998 XP002229137 Retrieved from the Internet: <URL:http://www.ice.mtu.edu/online_docs/xfig332/> [retrieved on Jan. 28, 2003].
Usdin, Tommie et al., "XML: Not a Silver Bullet But a Great Pipe Wrench" Standardview vol. 6, No. 3, Sep. 1998, pp. 125-132.
Hwang et al., "Micro-Firewalls for Dynamic Network Security with Distributed Intrusion Detection"; IEEE INternational Symposium on Network Computing and Applications; 2001; pp. 68-79.
Kaiya et al., "Specifying Runtime Environments and Functionalities of Downloadable Components Under the Sandbox Mode"; International Symposium on Principles of Software Evolution; 2000; pp. 138-142.
Prevelakis et al., "Sandboxing Applications"; Proceedings of the FREENIX Track; 2001; pp. 119-126.
Schmid et al., "Protection Data from Malicious Software"; 18th Annual Computer Security Applications Conference; 2002; pp. 199-208.
Tomimori et al., "An Efficient and Flexible Access Control Framework for Java Programs in Mobile Terminals"; 22nd International Conference on Distributed Computing Systems Workshops; 2002; pp. 777-782.
Whitehill, "Whitehill Composer" Whitehill Technologies Inc. 2 pages.
Clarke, P., "From small beginnings," Knowledge Management, Nov. 2001, pp. 28-30.
Description of Whitehill Composer software product, produced by Whitehill Technologies, Inc., available at <http://www.xml.com/pub/p/221>, accessed on Apr. 8, 2004, two pages.
Sun, Q., et al., "A Robust and Secure Media Signature Scheme for JPEG Images," Proceedings of 2002 IEEE Workshop on Multimedia Signal Processing, Dec. 2002, pp. 296-299.
Komatsu, N., et al., "A Proposal on Digital Watermark in Document Image Communication and Its Application to Realizing a Signature," Electronics and Communications in Japan, Part I: Communications, vol. 73, No. 5, May 1990, pp. 22-33.
Noore, A., "A Secure Conditional Access System using Digital Signature and Encryption," International Conference on Consumer Electronics, Jun. 2003, pp. 220-221.
Pacheco, X., et al., "Delphi 5 Developer's Guide," Sams Publishing 1999, Section: Data Streaming, 6 pages.
Clark, James, Ed.; "XSL Transformation (XSLT) Version 1.0", Nov. 16, 1999, W3C (MIT, INRIA, Keio), pp. 1-156.
Clark, James and Steve Derose, "XML Path Language (XPath) Version 1.0", Nov. 16, 1999, W3C (MIT, INRIA, Keio), pp. 1-49.
Musgrave, S., "Networking technology—impact and opportunities", Survey and Statistical Computing 1996. Proceedings of the Second ASC International Conference. Sep. 1996. pp. 369-378. London, UK.
Rapaport, L., "Get more from SharePoint", Transform Magazine, vol. 11, No. 3, Mar. 2002, pp. 13, 15.
McCright, J.S., "New Tool Kit to Link Groove with Microsoft SharePoint", eWeek, Enterprise News & Reviews, Ziff Davis Media Inc., Jul. 29, 2002, 1 page.
U.S. Appl. No. 60/209,713, filed Jun. 5, 2000.
Richard Scott Hall, "Agent-based Software Configuration and Deployment," Thesis of the University of Colorado, Online, Dec. 31, 1999, retrieved from the Internet on Nov. 7, 2003: <http://www.cs.colorado.edu/users/rickhall/documents/ThesisFinal.pdf>, 169 pages.
Arthur Van Hoff et al., "The Open Software Description Format," Online, Aug. 13, 1997, retrieved from the Internet on Nov. 7, 2003: <http://www.w3.org/TR/NOTE-OSD>, 11 pages.
Netscape Communications Corp., "SmartUpdate Developer's Guide," Online, Mar. 11, 1999, retrieved from the Internet on Dec. 8, 2000: <http://developer.netscape.com:80/docs/manuals/communicator/jarman/index.htm>, 83 pages.
Linnea Dayton and Jack Davis, "Photo Shop 5/5.5 WOW! Book," 2000, Peachpit Press, pp. 8-17.
Sara Williams and Charlie Kindel, "The Component Object Model: A Technical Overview," Oct. 1994, Microsoft Corp., pp. 1-14.
Varlamis et al., "Bridging XML-Schema and relational databases. A system for generating and manipulating relational databases using valid XML documents," DocEng '01, Nov. 9-10, 2001, Copyright 2001, ACM 1-58113-432-0/01/0011, pp. 105-114.
Hardy et al., "Mapping and Displaying Structural Transformations between XML and PDF," DocEng '02, Nov. 8-9, 2002, Copyright 2002, ACM 1-58113-594-7/02/0011, pp. 95-102.
Kim et al., "Immediate and Partial Validation Mechanism for the Conflict Resolution of Update Operations in XML Databases," WAIM 2002, LNCS 2419, 2002, pp. 387-396, Springer-Verlag Berlin Heidelberg 2002.
Chuang, T., "Generic Validation of Structural Content with Parametric Modules," ICFP '01, Sep. 3-5, 2001, Copyright 2001, ACM 1-58113-415-0/01/0009, pp. 98-109.
Chen et al., "Designing Valid XML Views," ER 2002, LNCS 2503, 2002, Springer-Verlag Berlin Heidelberg 2002, pp. 463-477.
Chen et al., "XKvalidator: A Constraint Validator for XML," CIKM '02, Nov. 4-9, 2002, Copyright 2002, ACM 1-58113-492-4/02/0011, pp. 446-452.
W. Brogden, "Arbortext Adept 8 Editor Review," O'Reilly XML.COM, 'Online! Sep. 22, 1999) XP002230080. retrieved from the Internet <URL:http://www.xml.com/pub/a/1999/09/adept/AdeptRvw.htm>, retrieved on Feb. 5, 2003.
L Alschuler, "A tour of XMetal" O'Reilly XML.COM, 'Online! Jul. 14, 1999, XP002230081, retrieved from the Internet: <URL:http://www.xml.com/pub/a/SeyboldReport/ip031102.html>, retrieved on Feb. 5, 2003.
A. Davidow, "XML Editors: Allegations of Functionality in search of reality," Internet, 'Online! 1999, XP002230082, retrieved from the Internet, <URL:http://www.ivritype.com/xml/>.
Steven A. Battle, et al., "Flexible Information Presentation with XML", 1998, The Institution of Electrical Engineers, 6 pages.

Paolo Ciancarini, et al., "Managing Complex Documents Over the WWW: A Case Study for XML", IEEE Transactions on Knowledge and Data Engineering, vol. 11, No. 4, Jul./Aug. 1999, pp. 629-638.

Hirotaka Kanemoto, et al., "An Efficiently Updatable Index Scheme for Structured Documents", 1998 IEEE, pp. 991-996.

Tommie Usdin, et al., "XML: Not a Silver Bullet, But a Great Pipe Wrench", Standardview vol. 6, No. 3, Sep. 1998, pp. 125-132.

Supoj Sutanthanavibul, et al., "XFIG Version 3.2 Patchlevel2(Jul. 2, 1998) Users Manual (Edition 1.0)", Internet Document, [Online] Jul. 2, 1998, XP002229137 Retrieved from the Internet: <URL:http://www.ice.mtu.edu/online_docs/xfig332/> [retrieved on Jan. 28, 2003].

"Architecture for a Dynamic Information Area Control", IBM Technical Disclosure Bulletin, IBM Corp. New York, US, vol. 37, No. 10, Jan. 10, 1994, pp. 245-246.

Irene Au & Shuang Li, "Netscape Communicator's Collapsible Toolbars," CHI '98, Human Factors in Computing Systems, Conference Proceedings, Los Angeles, CA, Apr. 18-23, 1998, pp. 81-86.

Netscape Communication Corporation: "Netscape Communicator 4.61 for OS/2 Warp" Software, 1999, The whole software release & "Netscape—Version 4.61 [en]—010615" Netscape Screenshot, Oct. 2, 2002.

Rogge et al., "Validating MPEG-21 Encapsulated Functional Metadata," IEEE 2002, pp. 209-212.

Nelson, "Validation with MSXML and XML Schema," Windows Developer Magazine, Jan. 2002. pp. 35-38.

Chien et al., "XML Document Versioning," SIGMOD Record, vol. 30, No. 3, Sep. 2001, pp. 46-53.

Wong et al., "Managing and Querying Multi-Version XML Data with Update Logging," DocEng '02, Nov. 8-9, 2002, Copyright 2002, ACM 1-58113-594-7/02/0011, pp. 74-81.

Chien et al., "Efficient schemes for managing multiversionXML documents", VLDB Journal (2002), pp. 332-353.

Chien et al., "Efficient Management of Multiversion Documents by Object Referencing," Proceedings of the 27th VLDB Conference, 2001, pp. 291-300.

Chien et al., "Storing and Querying Multiversion XML Documents using Durable Node Numbers," IEEE 2002, pp. 232-241.

Dyck, T., "XML Spy Tops as XML Editor," http://www.eweek.com/article2/0,3959,724041,00.asp, Nov. 25, 2002, 2 pages.

"Netscape window" Netscape Screenshot, (Oct. 2, 2002).

Jan-Henrick Haukeland: "Tsbiff—tildeslash biff—version 1.2.1" Internet Document, [Online] Jun. 1999. URL:http://web.archive.org/web/19990912001527/http://www.tildeslash.com/tsbiff/.

Altova, Inc., "XML Spy 4.0 Manual," Altova Inc. & Altova GmbH, coyright 1998-2001, Chapters 1, 2, and 6, encompassing pp. 1-17, 18-90, and 343-362.

Cybook, INC.; "Copying the Search Form to Services-based Web Sites" INternet Article, (online) Jul. 26, 2004."the whole document".

Excel Developer Tip (hereinafter "Excel"), "Determing the Data Type of a Cell", May 13, 1998, p. 1 (available at http://jwalk.com/ss//excel/tips/tip62.htm).

Macromedia, INC.: "Dreamweaver Technote, Changes in copying and pasting in Dreamweaver 4" Internet Article (online). "the whole document".

Rado, Dave: "How to create a template that makes it easy for users to "fill in the blanks", without doing any programming" Microsoft Word MVP FAQ Site, (online) Apr. 30, 2004, the whole document.

Atova, "User Reference manual Version 4.4, XML Spy suite 4.4," Atova Ges.m.b.H and Altova, Inc., May 24, 2002, pages cover, copyright p. 1-565.

Altova et al. XML Spy, XML integrated Development Environments, Altova Inc., 2002, pp. 1-18.

Ben-Natan, U.S. Appl. No. 60/203,081, filed May 9, 2000, entitled "Internet platform for creating and supporting communities".

Ixia Soft, "Steamlining content creation, retrieval, and publishing on the Web using TEXTML Server and SML Spy 4 Suite in an integrated, Web publishing environment," (Partner's Whitepaper, published on the Web as of Jun. 6, 2002, downloaded pp. 1-16.

Kutay, U.S. Appl. No. 60/209,713, filed Jun. 5, 2000, entitled, "Methods and systems for accessing, organizing presenting and viewing data".

Microsoft Word 2000 (see Screen Shot "About Microsoft Word") Published 1983-1999 and Microsoft Excel 2000 (see Screen Shot "About Microsoft Excel") Published 1988-1999, Three pages.

Moore, U.S. Appl. No. 60/191,662, filed Mar. 23, 2000, entitled "Collection-based presistent digital archives".

IBM: Stack Algorithm for Extractin Subtree from Serialized Tree, Mar. 1, 1994, TDB-ACC-NONN94033, 3 pages.

Laura Acklen & Read Gilgen, "Using Corel Wordperfect 9", 251-284, 424-434, 583-586 (1998).

Bruce Halberg et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.

LeBlond et al, "PC Magazine Guide to Quattro Pro for Windows", pp. 9-11, 42-61, Ziff-Davis Press, Copyright 1993 by the LeBlond Group.

Mansfield, "Excel 97 for Busy People", Published by Osborne/Mcgraw-Hill 1997 pp. 48-50.

"Microsoft Visual Basic 5.0 Programmer's Guide 1997"; pp. 578-579; Redmond WA 98052-6399.

Han et al., WebSplitter: A Unified XML Framework for Multi-Device Collaborative Web Browsing, 2000, ACM Conference on Cimputer Supported Cooperative Work, 10 pages.

Cover, XML Forms Architecture, retrieved at <<http://xml.coverpages.org/xfa.html>> on Aug. 17, 2006, Coverpages, Jun. 16, 1999.

Raggett, "HTML Tables", retrieved on Aug. 6, 2006, at <<http:www://is-edu.hcmuns.edu.vn/WebLib/books/Web/Tel/html3-tables.html>>, W3C Internet Draft, Jul. 7, 1995, pp. 1-12.

"Webopedia Computer Dictionary" retrieved on May 9, 2006, at <<http://www.pewebopedia.com/TERM/O/OLE, html>>, Jupitermedia Corporation, 2006, pp. 07.

"Enter Key", Retrieved from the Internet at http://systems.webopedia.com/TERM/Enter_key.html on Dec. 20, 2006.

"Microsoft Visual Basic 5.0 Programmer's Guide", *Microsoft Press*, (1997), pp. 42-43, 54-58.

"Microsoft Word 2000", Screenshots, (1999), 1-5.

Beauchemin, Dave, "Using InfoPath to Create Smart Forms", Retrieved from the Internet at http:/www.microsoft.com/office/infopath/prodinfo/using.mspx on Jan. 21, 2007,(Mar. 27, 2003).

Begun, Andrew, et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004).

Borland, Russo, "Running Microsoft Word 97", 314-315, 338, 361-362, 390, and 714-719.

Brabrand, et al., "Power Forms Declarative Client-side Form Field Validation", (2002),1-20.

Dubinko, Micah, "XForms and Microsoft InfoPath", Retrieved from the Internet at http://www.xml.com/lpt/a/1311 on Jan. 21, 2007,(Oct. 29, 2003).

Hoffman, Michael, "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).

Lehtonen, Miro, et al., "A Dynamic User Interface for Document Assembly", Department of Computer Science, University of Helsinki,(Nov. 2002).

Nelson, Joe, "Client-side Form Validation Using JavaScript", *Developer Advisory*, (Sep. 21, 2001).

Raman, T. V., et al., "XForms 1.0", (Dec. 2001),Section 1-12.2.3 & Appendices A-G.

Rees, Michael J., "Evolving the Browser Towards a Standard User Interface Architecture", School of Information Technology, Bond University, Australia,(2001).

Singh, Darshan, "Microsoft InfoPath 2003 by Example", Retrieved from the Internet at http://www.perfectxml.com/InfoPath.asp on Jan. 21, 2007,(Apr. 20, 2003).

Udell, Jon, "InfoPath and XForms", Retrieved from the Internet at http://weblog.infoworld.com/udell/2003/02/26.html,(Feb. 26, 2003).

Baraband et al., PowerForms: "Declarative Client Site Form Field Validation", World Wide Web, Baltzer Science Publishers, Bussum, NL. vol. 3, No. 4, Dec. 2000, p. 1-20.

Microsoft Corporation, "Microsoft Computer Dictionary" Microsoft Press, Fifth Edition, p. 149.

Anat, Eyal et al., "Integrating and Customizing Hererogeneous E-Commerce Applications", The VLDB Journal-The International Journal on Very Large Data Bases, vol. 10, Issue 1,(Aug. 2001), 16-38.

Adams, Susie et al., "BizTalk Unleashed", Sams publishing, 2002, first printing Mar. 2001, 1-2, 31-138.

Vasters, Clemens F., "BizTalk Server 2000 A Beginner's Guide", Osborne/McGraw-Hill,(2001), 1-2, 359-402.

Halberg, Bruce et al., "Using Microsoft Excel 97", (1997), 191-201, 213-219.

Villard, et al., "An Incremental XSLT Transformation Processor for XML Document Manipulation", http://www2002.org/CDROM/refereed/321, Printed on May 18, 2007,(May 2002),25 pages.

Grosso, et al., "XML Fragment Interchange", W3C,(Feb. 2001), 1-28.

Altova, et al., "User and Reference Manual Version 4.4", www.xmlspy.com, (May 24, 2007), 1-565.

"XForm 1.0", W3C,(Jul. 16, 2001).

"Microsoft Word 2000 Screenshots", (2000),11-17.

XmlSpy, "XmlSpy 2004 Enterprise Edition Manual", Altova,(May 17, 2004),1-25, 220-225.

StylusStudio, "StylusStudio: XPath Tools", 2004-2007, StylusStudio,1-14.

Dodds, "Toward an XPath API", xml.com,(May 7, 2001),1-3.

Altova, "Altova Tools for XPath 1.0/2.0", Altova,1-12.

"Microsoft Word 2000 Screenshots", Word,(2000),1-17.

* cited by examiner

Purchase Order

Reference Number:
Priority: Normal
Date Ordered:
Charge To:
Date Required:

Submitted By
Name:
Address Line 1:
ID Number:
Address Line 2:
E-mail Address:
City:
Telephone Number:
State/Province:
Postal Code:
Country/Region:

Vendor Information
Company Name:
Address Line 1:
E-mail Address:
Address Line 2:
Telephone Number:
City:
Fax Number:
State/Province:
Postal Code:
Web Site Address:
Country/Region:

SYSTEM AND METHOD FOR OFFLINE EDITING OF DATA FILES

TECHNICAL FIELD

This invention relates to editing data files while offline.

BACKGROUND

Extensible markup language (XML) is increasingly becoming the preferred format for transferring data. XML is a tag-based hierarchical language that is extremely rich in terms of the data that it can be used to represent. For example, XML can be used to represent data spanning the spectrum from semi-structured data (such as one would find in a word processing document) to generally structured data (such as that which is contained in a table). XML is well-suited for many types of communication including business-to-business and client-to-server communication. For more information on XML, XSLT, and XSD (schemas), the reader is referred to the following documents which are the work of, and available from the W3C (World Wide Web consortium): XML Schema Part 2: Datatypes; XML Schema Part 1: Structures, and XSL Transformations (XSLT) Version 1.0; and XML 1.0 second edition specification.

One of the reasons that data files written in XML are often preferred for transferring data is that XML data files contain data, rather than a combination of data and the software application needed to edit the data. One problem with XML data files, however, is that to edit an XML data file, a user needs to first install a solution software application used to access, view, and edit the data file.

When a user is online, his computer can run a host application capable of accessing the Internet, such as Microsoft® Internet Explorer®, which can silently discover and deploy an XSLT, which enables the user to author and access an XML data file.

If a user wishes to save an XML data file for later, offline use, however, the user may encounter various problems. In some cases, a user wishing to reopen an XML data file offline will not be able to do so because he can no longer discover and deploy the XML data file's solution application. The user can no longer discover a solution if he is no longer online and the solution is accessible only online. In other cases, a user can access and deploy the solution application, but to do so the user must proactively discover the solution's name and where on his computer it resides, which a user may not know. And sometimes, a user's host application discovers the solution's name and where it resides, but the user has to instruct his computer to deploy the solution application, rather than the computer automatically opening the solution file when the user attempts to open the corresponding XML data file.

Even in those cases where a user can continue to author and access an XML data file offline by actively installing the XML data file's solution application, there often is another problem. When a user instructs his host application to open a solution for an XML data file, his host application may trust the solution, thereby setting the user's computer at risk. A solution originally accessed online could, for instance, contain a virus or worm. When the user instructs his host application to install the solution, it could introduce the virus or worm.

For these reasons, editing data files offline can be inconvenient and dangerous.

SUMMARY

The following description and figures describe an offline editing tool enabling offline editing of a data file with silent discovery and deployment of the data file's solution. This offline editing tool enables a user to edit data files by, performing certain actions before the user attempts to edit the data file while offline. When a user first opens a data file when online, for instance, the editing tool can download the data file's solution into a cache for later retrieval.

The offline editing tool follows appropriate security precautions to contain possibly dangerous code in a data file's solution even when the solution is installed from a local source, such as when a user is offline. This offline editing tool determines what level of security is appropriate for a data file's solution based on the original source of the solution.

BRIEF DESCRIPTION OF THE DRAWINGS

The same numbers are used throughout the disclosure and figures to reference like components and features.

DETAILED DESCRIPTION

The following disclosure describes an easy, simple, and secure way to access data files when offline. If a user has opened a data file first online, or if the system has otherwise received the data file's solution, a document manager application can silently discover and deploy a data file's solution. The document manager allows a user to simply select a data file to open and the document manager will open the data file with a discovered and deployed solution. The user need not discover, select, or even be aware that the data file requires a solution for the data file to be edited. After selecting the data file to open, the user can then edit and access the data file in a way very similar to how it would act and appear had the user opened the data file while online.

Data Files, Solutions, and Host Applications

Data files, their solutions, and a host application work together to allow a user to open and edit the data file. Data files contain little or no operable code, where as a solution file containing presentation and logic applications. Because editing a data file requires a solution, if a user tries to open a data file without a solution, she could get a error, a prompt asking the user to open a solution, or perhaps a flat list of the data in the data file.

To view and edit a data file then, the data file's solution is needed. A data file's solution application is one or more files that, when installed, are used to enable a user to view, access, and edit the data file.

In addition to the data file and its solution, a host application is needed. This application works to enable the solution to function fully. In this description, a document manager application is described, which is capable not only of acting as a host application (allowing a solution to function properly), but can also allow a user to open a data file without actively finding and installing the data file's solution.

For discussion purposes, the system and method described herein are described in the context of a single computer, a communications network, a user-input device, and a single display screen. These devices will be described first, followed by a discussion of the techniques in which these and other devices can be used.

Exemplary Architecture

Figure 1:
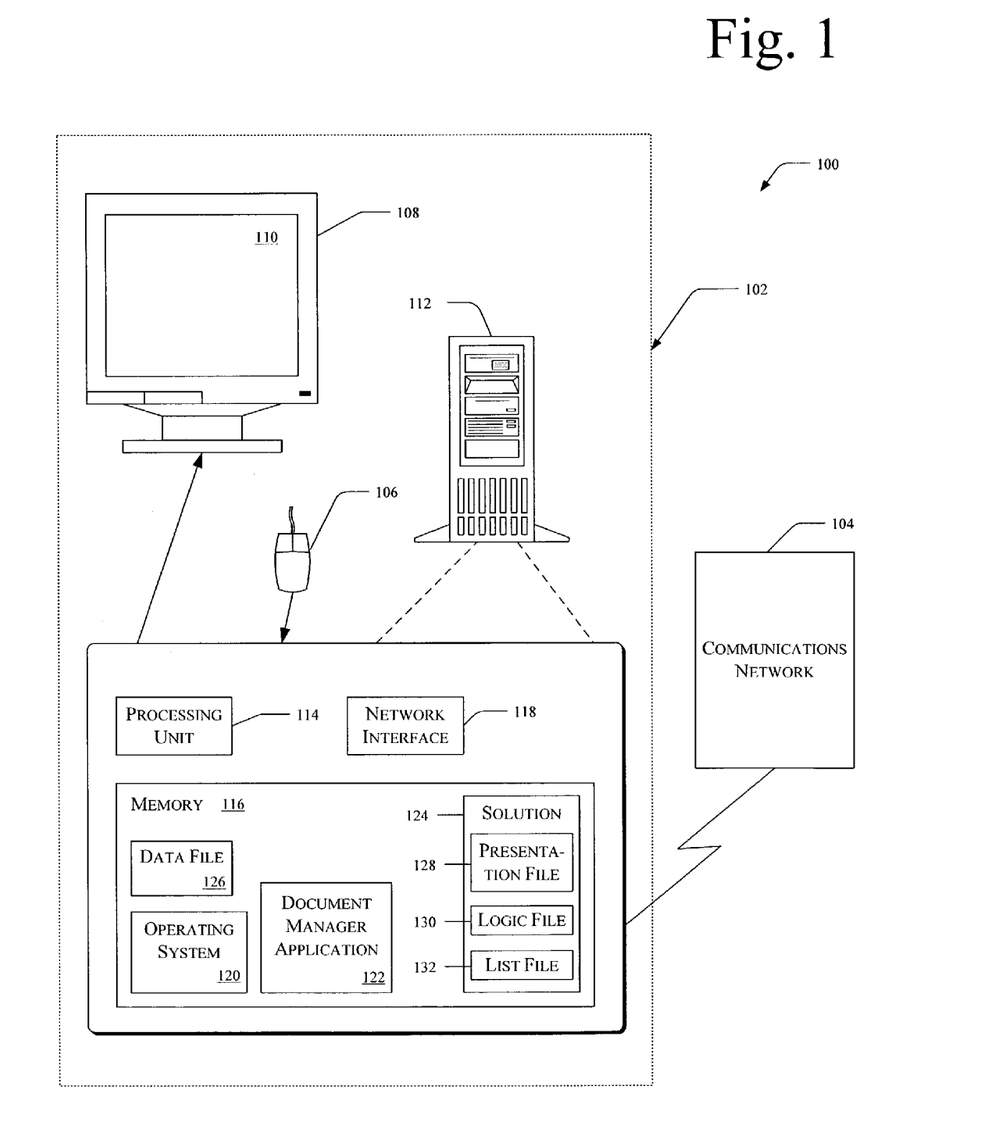
FIG. 1 illustrates a communications network and a system capable of implementing a method for offline editing of data files.

FIG. 1 shows an exemplary architecture 100 to facilitate online and offline editing of data files. This architecture 100 includes a computing system 102 connected to a communications network 104. The system 102 is configured to go online and communicate via the communications network 104 to gain access to non-local information sources, such as sources on an intranet or global network. Alternatively, the system 102 can remain offline, where it utilizes local resources without communicating over the communications network 104.

The computing system 102 includes a user-input device 106, a display 108 having a screen 110, and a computer 112. The user-input device 106 can include any device allowing a computer to receive a designer's preferences, such as a keyboard, a mouse, a touch screen, a voice-activated input device, a track ball, and the like. With the user-input device 106, a user can edit a data file by adding or deleting information within a data-entry field on an electronic form, for instance. The user can use the display 108 and its screen 110 to view the data files.

The computer 112 includes a processing unit 114 to execute applications, a memory 116 containing applications and files, and a network interface 118 to facilitate communication with the communications network 104. The memory 116 includes volatile and non-volatile memory, and applications, such as an operating system 120 and a document manager application 122. The memory 116 also includes a solution 124 for a data file 126. The solution 124 is located locally in the memory 116, but often has a different original source, such as a source on the communications network 104. The solution 124 contains one or more files, such as a presentation file 128, logic file 130, and list file 132, which will be discussed in greater detail below.

The document manager application 122 facilitates offline editing of the data files 126 and is executed by the processing unit 114. The document manager 122 is capable of acting as a host application and enabling a user to open the data file 126 without actively finding and installing the data file's solution 124. Without any user interaction, other than the user attempting to open the data file 126, the document manager 122 discovers and installs the data file's solution 124. Thus, the user does not have to do anything but request to open the data file 126. The user does not have to discover the data file's solution 124. The user does not have to install the data file's solution 124. This silent discovery and deployment allows the user to view, edit, and otherwise interact with the data file 126 with just a single request. In addition, the document manager 122 can provide security offline similar to the security that the user typically enjoys when running a solution online.

A view of the data file 126 is depicted on screen 110 through execution of the data file's solution 124. The solution 124 contains one or more applications and/or files that the document manager 122 uses to enable a user to edit the data file 126. To edit the data file 126 in a user-friendly way, the data file's solution 124 contains the presentation file 128, which includes an electronic form. This presentation file 128 gives the user a graphical, visual representation of data-entry fields showing previously entered data or blank data-entry fields into which the user can enter data. Data files often have one solution but each solution often governs multiple data files.

Figure 2:
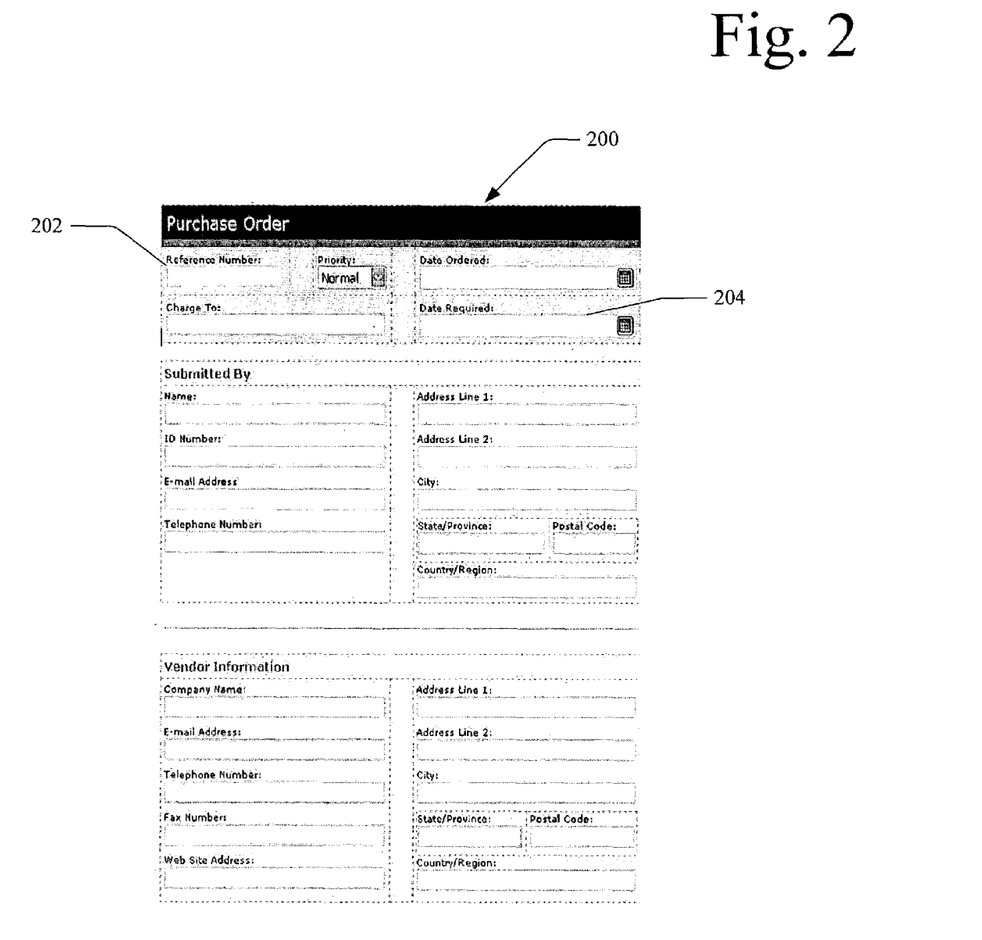
FIG. 2 illustrates an exemplary electronic form whereby a user can edit a data file.

FIG. 2 shows an electronic form 200 entitled "Purchase Order", which is generated by the solution 124. This purchase order 200 contains data-entry fields in which a user can enter data. These data-entry fields map to the data file 126, so that the data entered into the form are retained in the data file 126.

This solution 124 presents an electronic form but also contains the logic file 130 that governs various aspects of the electronic form and the data file 126. In a reference number data-entry field 202, for instance, the solution 124 presents the data-entry field as a white box within a gray box, provides a description of the data desired with the text "Reference Number", and contains logic requiring that the user enter only numbers. Thus, if the user attempted to enter letters, the logic file 130 of the solution 124 would not permit the user's entry. The solution 124 could reject it and inform the user of the problem, such as with a sound, flashing error signal, pop-window, or the like.

The logic file 130 is employed in the solution 124 to ensure that the right kind of data is being entered and retained by the data file 126. A user's business manager attempting to reference purchases with a reference number, for instance, would like the solution 124 to have numbers in the reference number data-entry field 202; the manager may not be able to determine how an order should be handled if the reference number entered is incorrect because it contains letters.

Similarly, suppose a business manager wants the delivery date for delivery of a purchased product. To require this, the logic file 130 of purchase order 200's solution 124 could be constructed to require a date to be entered into a date-required data-entry field 204. The logic file 130 can be internal to the solution 124, or can be implied from the data file 126 even if the data file 126 is primarily data. The logic file 130 can also be a schema, such as an XML schema.

A solution can govern multiple data files. The exemplary purchase order 200, for example, allows one or more users to fill out many different orders. Each time a user fills out a purchase order form, the system 102 can create a separate data file for that order. Often, a user will create many different data files having the same solution. For each data file edited after the first, the system 102 is likely to have the appropriate solution stored in the memory 116. Thus, if a user previously opened a first data file and later attempts to open a second data file, both of which utilize the purchase order 200 solution, the document manager 122 can silently discover and deploy the purchase order 200 solution to enable the user to edit the second data file. How the document manager 122 discovers and deploys solutions will be discussed in greater detail below.

A solution can be one file or contain many files, so long as the files used to edit data files it governs are included. The solution 124 of FIG. 1 includes the listing file 132, which is a manifest of all of the other files in the solution 124 and contains information helping the document manager 122 to locate them. The logic file 130 and presentation file 128 can be joined or separate. The presentation file 128 helps the document manager 122 present or give a view of a form enabling entry of data into the data file 126, such as a visual representation of the data file 126 by the purchase order 200 electronic form. In some implementations, the presentation file is an XSLT file, which, when applied to an XML data file, generates a XHTML (eXtensible Hyper-Text Markup Language) or HTML (Hyper-Text Markup Language) file. XHTML and HTML files can be used to show a view on the screen 110, such as the purchase order 200 of FIG. 2.

A solution, such as the solution 124, can also include various files or compilations of files, including a manifest file setting forth names and locations for files that are part of the solution 124. The files within the solution 124 can be packaged together, or can be separate. When separate, the list file 132 acts as a manifest of the files within the solution 124. The list file 132 can also include other information, such as definitions, design time information, data source references, and the like. When the files are packaged together, the document manager 122 can simply install and execute the packaged solution file for a particular data file. When not packaged, the document manager 122 can read the list file 132, find the listed files, and install and execute each of the listed files for the particular data file. The list file 132 and the packaged solution file can be interrelated in that an packaged file contains the list file 132 and the list file 132 lists files packaged within the packaged file, although usually only one need be discovered by the system 102 to open a particular data file.

Like solutions, data files can come in various types and styles. As mentioned above, data files can be written in XML or some other mark-up language, or can be written in other languages. Most data files, however, do not contain extensive logic and other files or code. One of the benefits of having data files separate from their solutions, is that it makes the data within them easier to mine. Because the data files are separate from their solution, the document manager 122 makes them easy to open and edit by silently discovering and deploying the solution for the data file.

Data files also are typically concise and data-centered so that the data they contain can be more easily accessed or manipulated by multiple software applications, including software not typically used in a solution, such as an application that searches for a particular type of data and compiles that data into a report. A non-typical application, for example, could be one that compiles a report of all of the purchase orders required to be mailed by a certain date by searching through and compiling the data entered into data files through the date required data-entry field 204 of the purchase order 200 electronic form.

The above devices and applications are merely representative, and other known devices and applications may be substituted for or added to those shown in FIG. 1. One example of another known device that can be substituted for those shown in FIG. 1 is the device shown in FIG. 5.

Techniques for Silent Discovery and Deployment of Data File Solutions

Overview

Figure 3:
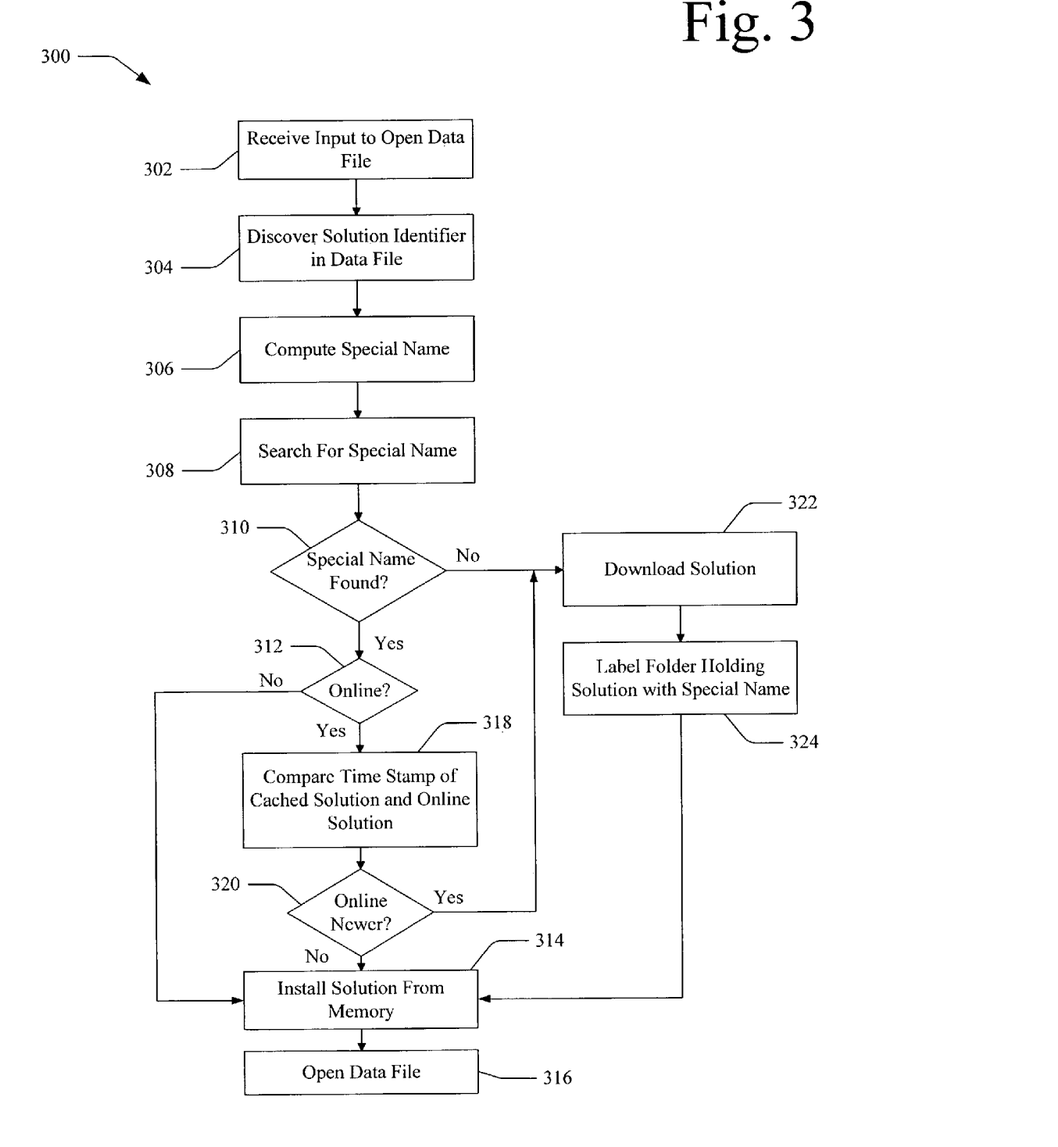
FIG. 3 is a flow diagram of an exemplary process for editing of data files while online or offline.

FIG. 3 shows a process 300 for silently discovering and deploying a data file's solution. The process 300 is illustrated as a series of blocks representing individual operations or acts performed by the architecture 100. The process 300 may be implemented in any suitable hardware, software, firmware, or combination thereof. In the case of software and firmware, the process 300 represents a set of operations implemented as computer-executable instructions stored in memory and executable by one or more processors.

Silent Discovery and Deployment

At block 302, the system 102 receives input from a user to open the data file 126. The user may simply click on a icon representing the data file 126 or otherwise select the data file 126 after which the system 102 opens the data file 126.

At block 304, the system 102 discovers a solution identifier in the selected data file 126. This assumes that the data file 126 is one in which the document manager 122 is capable of reading. The document manager 122 can read data files created at some previous time by the user's or another's document manager 122. In one implementation, the document manager 122 can also read the data file 126 if it is created by another application that builds a solution identifier into the data file 126.

This solution identifier can give the system 102 an original source for the solution 124. With an original source for the solution 124, the system 102 has one manner in which to help determine the proper security appropriate for the solution 124. How the system 102 and the document manager 122 handle security for a solution 124 is set forth in greater detail below.

The solution identifier is typically a URL (Uniform Resource Locator) or URN (Uniform Resource Name), but can include other types of names and/or locators. URLs give locations and URNs names of resources, such as the solution 124, which are typically accessible through the communications network 104. With the solution identifier, the system 102 can determine the original source for the solution 124 (where it first came from) and whether or not the system 102 has seen the solution 124 before.

In one implementation, the solution identifier is part of a processing instruction included within the data file 126. This processing instruction is often part of data files and can include various instructions to host applications, such as the document manager 122. Processing instructions, while not strictly data, do not rise to the level of an applet or application typically included in a solution for a data file. For data files written in XML, for instance, the processing instructions are usually not written in XML, but rather are just a piece of information commonly included. A processing instruction in an XML data file can look like "<? mso-infoPathSolution solutionVersion="1.0.0.3" PIVersion="1.0.0.0" href="http://xdsp04-neten/MiladinP/Forms/template.xsn" ?>". This processing instruction gives the document manager 122 a solution identifier, which here gives the original source for the solution for the data file. This solution identifier includes a URL indicating that the original location for the solution is at a remote server accessible by accessing the communications network 104 through the network interface 118.

One of the advantages of the document manager 122 is that it enables a user to open the data file 126 without the user needing to discover the data file's solution 124, install the solution 124, or even know that the solution 124 exists. This system and method enables users to open data files simply and easily and in many cases enables them to edit a data file offline that they would otherwise not have been able to edit.

With the solution identifier, the system 102 computes a special name for the solution 124 (block 306). This special name is designed to be a name easily found only by the document manager 122. The special name, because it is computed and findable by the document manager 122 but is not intended to be discoverable by other applications, allows for greater security in downloading possibly hostile solutions from the communications network 104.

In one implementation, the document manager 122 takes the solution identifier and computes a unique special name for the solution identifier. This unique special name is repeatable; the next time the document manager 122 computes a unique special name for the same solution identifier, the same unique special name will be created. By so doing, the document manager 122 can find a previously downloaded solution by computing the unique, special name and then searching for the unique, special name to determine if the solution is available locally for offline use (such as by having the solution stored in the memory 116).

In another implementation, the document manager 122 computes a unique special name by computing a hash, such as a Message Digest 5 hash (MD5 hash), of the solution identifier. By computing a one-way hash of the solution identifier, the document manager 122 creates a unique, special name that is a file of 128 bits from the digits of the solution identifier. Because the file of the unique, special name is 128 bits long, it is very difficult for another application, such as one designed to damage a computer or its files, to determine if the solution 124 is on the computer (cached or available offline) and access the solution 124. With this hash-based special name, the document manager 122 provides additional security for the system 102.

The system 102 uses the special name, which corresponds to a solution identifier and thus the data file's solution 124, to search through locally accessible sources for the solution 124 (block 308). The system 102 may, for instance, search files and folders in the memory 116 of FIG. 1 for files and/or folders with the same name as the special name computed in the block 306.

When the Special Name is Found

If the system 102 finds the special name (i.e., the "Yes" branch from block 310) the solution 124 was saved earlier in the system 102 searched locally in the block 308. Thus, when the special name is found, the system 102 knows that the solution 124 referred to in the data file (which the user is attempting to open) is accessible offline by the system 102. The solution 124 is usually stored in the memory 116 but can be stored in other searchable, local sources that the system 102 does not have to go online to find.

The solution 124, stored at the source and found using the special name, may not be current, however. Because of this, the system 102 determines whether or not the system 102 is online or offline (block 312). If online (i.e., the "Yes" branch from block 312), the system 102 will attempt to determine whether or not a more up-to-date solution should be installed (discussed below); if offline, the system 102 will proceed to install the locally stored solution 124 (block 314).

If the Solution is Found and the System is Offline

If the solution 124 is found and the system 102 is offline, the system 102 proceeds to install the solution 124 from the memory 116 or another locally accessible source (block 314).

The system 102 installs the solution 124 silently in that the user does not need to know that the solution 124 was discovered, found, or being installed. Thus, the system 102 enables a user to edit the data file 126 when offline by silently discovering and deploying the data file's solution 124.

In one implementation, the system 102 installs the solution 124 and then opens the data file 126 in such a manner as to mimic how the data file 126 would be opened had the user opened the data file 126 with the solution accessible online, such as through opening the data file 126 with Microsoft® Internet Explorer®. The system 102 does so to make opening and editing the data file 126 as comfortable for the user as possible, because many users are familiar with opening data files online. One possible difference, however, is that if the system 102 has a slow connection to the communications network 104, the document manager 122, by installing the solution 124 from a local source like the memory 116, may more quickly open the data file 126 than if the user were online.

Also in block 314, the document manager 122 can install the solution 124 for the selected data file with certain constraints for security, which will be discussed in greater detail as part of a process 400 of FIG. 4.

In block 316, the system 102 opens the data file 126 to enable the user to edit the data file 126. One example of an opened data file (and solution) enabling edits is the purchase order 200 of FIG. 2. In this example, the user is able to edit the data file 126 by adding, deleting, or changing data in data entry fields (like the reference number data-entry field 202 and the date required data-entry field 204) even though offline.

Following the previous blocks, a user can easily open a data file offline without having to discover or deploy the data file's solution. This enables users, for example, after first opening a solution online, to open a data file offline. A user can open a data file online and edit it by adding a reference number through the reference number data-entry field 202 of the purchase order 200 electronic form and then stop editing the data file (the data file would contain the added reference number by the system 102 adding the reference number to the data file). The user could then go offline, such as by taking his or her laptop on a business trip, and complete filling out the electronic form. Or the user could send the partially filled-out data file to another user to fill out the rest of the electronic form, which the other user could do so long as the other user's system contains a stored solution. This flexibility allows users and businesses a greater ability to use information by keeping data and solutions separate and by allowing offline use of data files.

If the Solution is Found and the System is Online

Assuming the system 102 finds the special name and the system is online, the system 102 will attempt to determine whether the current solution is the most recent version or a more up-to-date solution is available. In block 318, the system 102 compares the time stamp of the stored solution 124 and the online solution. Since the system 102 is online, it can access the solution (here we assume that the original origin of the solution 124 is from an online source). If the solution identifier from the data file 126 selected by the user contains a reference to the solution 124 being accessible online, the system 102 goes online to check whether or not the online solution is newer than the stored solution 124 (block 320). In one implementation, the system 102 compares the time stamp of the online solution with a time stamp on the stored solution 124.

If the online solution is not newer (i.e., the "No" branch from block 320), the system 102 proceeds to the block 314, installing the stored solution 124. If the online solution is newer than the stored solution 124 (i.e., the "Yes" branch from block 320), the system 102 either replaces the stored solution 124 with the online solution or otherwise updates the older, stored solution 124.

Downloading the Solution for Later Use

In block 322, the architecture 100 (or the system 102 by accessing the communications network 104) downloads a solution into a locally accessible source such as the memory 116. The system 102 downloads this solution when the data file 126 selected by a user contains a solution identifier for a solution for which the system 102 does not have local access (such as it not being cached) or for which the system 102 has local access but the cached or stored version of the solution (the solution 124) is older than the online version.

In either case, the system 102 has already discovered the solution identifier for the solution and computed a special name for the solution. The system 102 then downloads the solution from the online source and saves it into a folder named with the special name (block 324). If a solution already exists in that folder, the system 102 replaces it with the newer version or otherwise updates the currently cached solution. The resulting new or updated version then being the solution 124.

In one implementation, the system 102 saves the solution to a unique location within the system 102's accessible memory. The system 102 does so in cases where the system 102 is used by multiple users. By so doing, the system 102 is able to determine which of the users that use the system 102 or load files into memory locally accessible by the system 102 saved the particular solution. Also by so doing, the system 102 may provide greater security for the computer 112 and its users.

Techniques for Secure Deployment of Data File Solutions

Figure 4:
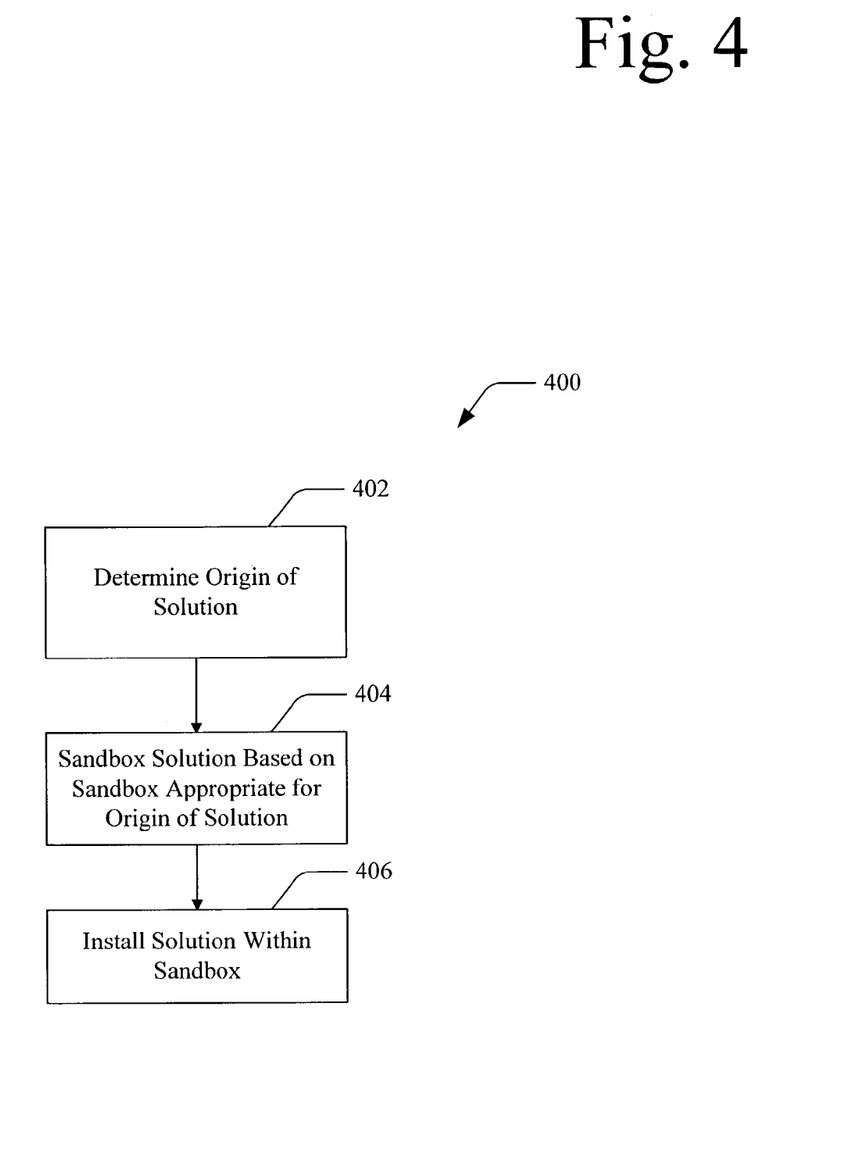
FIG. 4 is a flow diagram of an exemplary process for offline editing of a data file with security by sandboxing the data file's solution application.

FIG. 4 shows a process 400 for making deployment of data file solutions more secure. The process 400 is illustrated as a series of blocks representing individual operations or acts performed by the system 102. The process 400 may be implemented in any suitable hardware, software, firmware, or combination thereof. In the case of software and firmware, the process 400 represents a set of operations implemented as computer-executable instructions stored in memory and executable by one or more processors.

Through the process 300, discussed above, the system 102 enables a user to open and edit a data file by silently discovering and deploying the data file's solution. In the process 400, the system 102 acts to protect the user from the solution because some solutions contain dangerous code, like viruses and worms. To help prevent dangerous code from damaging the user's files and/or computer, the system 102 sandboxes the solution, if appropriate.

As part of this security, the system 102 can be configured to ask a user during an attempt to open a data file how the user wants to sandbox the data file's solution. Many users, however, often do not know what level of sandboxing to chose, and thus the explicit prompting slows the process and consumes unnecessary user time.

To make opening and editing a data file as easy as possible and because many users do not know what level of sandboxing a solution should be run within, the system 102 can be configured to sandbox a solution automatically, as set forth in FIG. 4 and the process 400 below.

In block 402, the system 102 determines the origin of a solution, such as the solution 124 of FIG. 1. The system 102, from block 304, discovered the solution identifier from the data file 126. With this solution identifier, the system 102 can determine the origin of the solution 124.

The solution identifier can be a URL, a URN, or another Uniform Resource Identifier (URI). URLs give a location for a solution and URNs a name, either of which can be used to locate and find the source of a solution. URLs usually indicate a non-local, online source for a solution like a remote server accessible through the communications network 104. URNs give the name of a solution, which typically can be accessed online (but could be accessed from a local, offline source), and are less subject to change by those in control of the solution. In either case, these solution identifiers give the system 102 the original source of the solution. The solution may be cached or otherwise stored by the system 102 in a local source (such as the solution 124 in the memory 116), but the local source is not indicated as the solution's origin by the solution's solution identifier, the local source is a new source.

With the origin of the solution known, the document manager 122 sets the appropriate level of security for the solution 124, sandboxing the solution 124 based on its origin (block 404). The document manager 122 sandboxes the solution 124, if from unknown or untrustworthy sources on the global internet with a sandbox allowing the solution 124 very little leeway in the operations it can perform, such as reading or altering other files on the computer 112. Greater trust, and so a weaker sandbox, are used for the solution 124 if it has an origin from known and more trustworthy sources accessed remotely, such as from MSN.com or a company intranet source. Very high trust, requiring a weak or no sandbox, is used for the solution 124 if is has an origin on the computer 112, such as when the user or another person using the user's computer created the solution 124.

Setting security levels and appropriate use of sandboxes for online use of solutions for data files are performed by various internet-capable host applications. The document manager 122, however, opens solutions and sandboxes them based on their origin even when the solution is opened from a local source that differs from the original origin of the solution. Typically, internet-capable host applications, such as Internet Explorer®, will not open a solution from a local source silently, but will return an error if the online copy is not available. The document manager 122, however, opens and executes, without user interaction, solutions in appropriate sandboxes even when a solution is loaded from a local source.

In block 406, the system 102 installs the solution 124 within an appropriate sandbox. This appropriate sandbox limits the operations that the solution 124 can perform, thereby helping to protect the computer 112 and its files from the solution 124.

A Computer System

Figure 5:
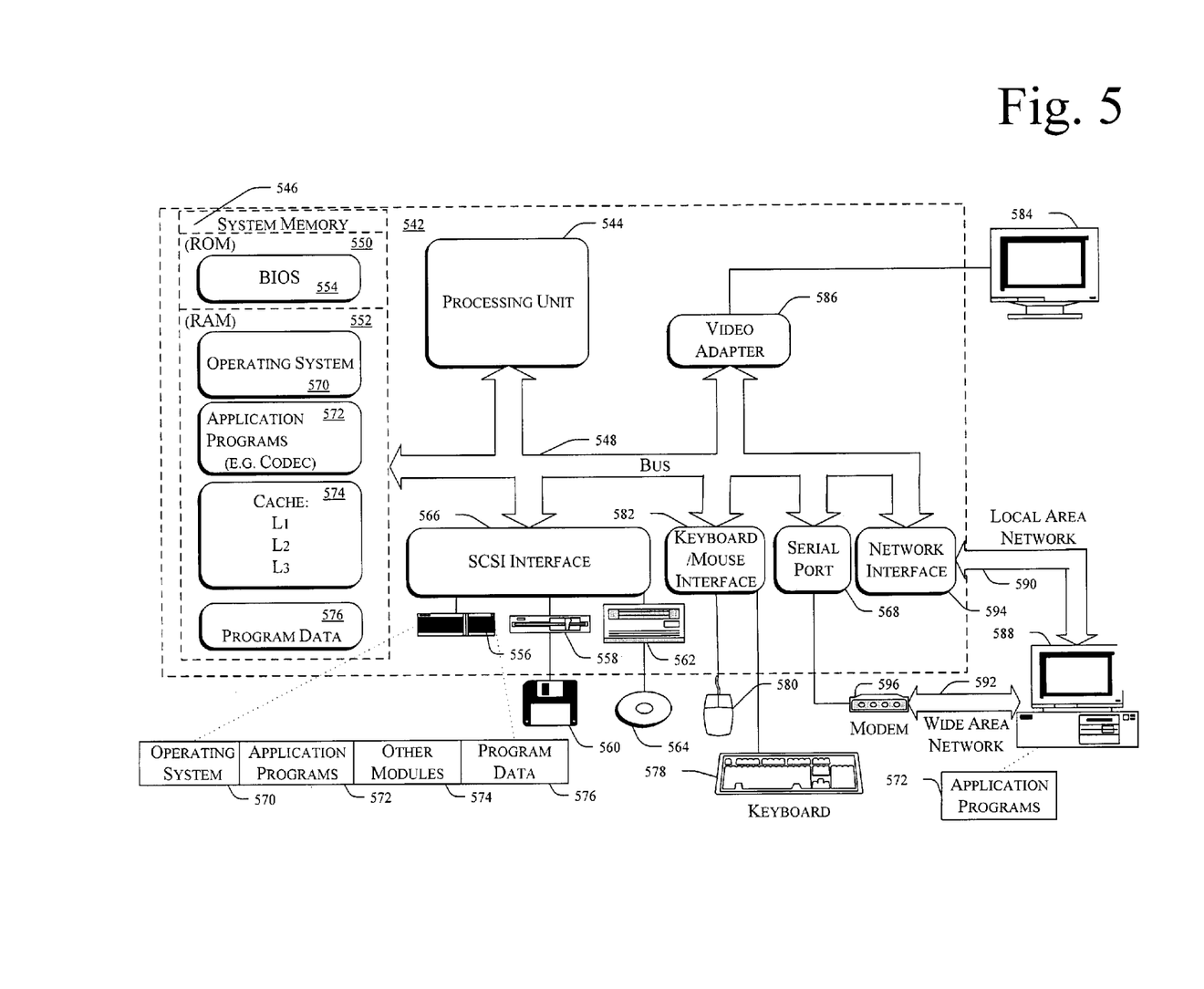
FIG. 5 is a block diagram of a computer system that is capable of supporting secure online and offline editing of data files.

FIG. 5 shows an exemplary computer system that can be used to implement the processes described herein. Computer 542 includes one or more processors or processing units 544, a system memory 546, and a bus 548 that couples various system components including the system memory 546 to processors 544. The bus 548 represents one or more of any of several types of bus structures, including a memory bus or memory controller, a peripheral bus, an accelerated graphics port, and a processor or local bus using any of a variety of bus architectures. The system memory 546 includes read only memory (ROM) 550 and random access memory (RAM) 552. A basic input/output system (BIOS) 554, containing the basic routines that help to transfer information between elements within computer 542, such as during start-up, is stored in ROM 550.

Computer 542 further includes a hard disk drive 556 for reading from and writing to a hard disk (not shown), a magnetic disk drive 558 for reading from and writing to a removable magnetic disk 560, and an optical disk drive 562 for reading from or writing to a removable optical disk 564 such as a CD ROM or other optical media. The hard disk drive 556, magnetic disk drive 558, and optical disk drive 562 are connected to the bus 548 by an SCSI interface 566 or some other appropriate interface. The drives and their associated computer-readable media provide nonvolatile storage of computer-readable instructions, data structures, program modules and other data for computer 542. Although the exemplary environment described herein employs a hard disk, a removable magnetic disk 560 and a removable optical disk 564, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 556, magnetic disk 560, optical disk 564, ROM 550, or RAM 552, including an operating system 570, one or more application programs 572 (such as the document manager application 122), other program modules 574, and program data 576. A user may enter commands and information into computer 542 through input devices such as a keyboard 578 and a pointing device 580. Other input devices (not shown) may include a microphone, joystick, game pad, satellite dish, scanner, or the like. These and other input devices are connected to the processing unit 544 through an interface 582 that is coupled to the bus 548. A monitor 584 or other type of display device is also connected to the bus 548 via an interface, such as a video adapter 586. In addition to the monitor, personal computers typically include other peripheral output devices (not shown) such as speakers and printers.

Computer 542 commonly operates in a networked environment using logical connections to one or more remote computers, such as a remote computer 588. The remote computer 588 may be another personal computer, a server, a router, a network PC, a peer device or other common network node, and typically includes many or all of the elements described above relative to computer 542. The logical connections depicted in FIG. 5 include a local area network (LAN) 590 and a wide area network (WAN) 592. Such networking environments are commonplace in offices, enterprise-wide computer networks, intranets, and the Internet.

When used in a LAN networking environment, computer 542 is connected to the local network through a network interface or adapter 594. When used in a WAN networking environment, computer 542 typically includes a modem 596 or other means for establishing communications over the wide area network 592, such as the Internet. The modem 596, which may be internal or external, is connected to the bus 548 via a serial port interface 568. In a networked environment, program modules depicted relative to the personal computer 542, or portions thereof, may be stored in the remote memory storage device. It will be appreciated that the network connections shown are exemplary and other means of establishing a communications link between the computers may be used.

Generally, the data processors of computer 542 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the blocks described below in conjunction with a microprocessor or other data processor. The invention also includes the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

Conclusion

The above-described system and method enables a user to edit data files when offline by discovering and deploying the data file's solution application. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A computer-implemented method comprising:
   receiving input to open a data file having a solution;
   discovering, without user interaction, the solution in an offline memory source;
   deploying, without user interaction, the solution;
   opening the data file effective to enable a user to edit the data file; and
   prior to receiving the input to open the data file:
   discovering a solution identifier in a prior data file governed by the solution;
   computing a special name from the solution identifier;
   naming a folder of an offline memory source with the special name; and
   downloading the solution from an online memory source into the folder.

2. The method of claim 1, wherein discovering the solution is performed using the special name.

3. A computer-implemented method comprising:
   receiving input to open a data file having a solution;
   discovering, without user interaction, the solution in an offline memory source;
   deploying, without user interaction, the solution;
   displaying a representation of the data file;
   prior to deploying the solution, updating the solution discovered in the offline memory source with a newer solution, wherein updating the solution includes:
   comparing a time stamp of the solution with a time stamp of the newer solution; and
   replacing the solution with the newer solution.

4. A computer-implemented method comprising:
   receiving input to open a data file;
   discovering a solution identifier in the data file;
   computing a special name corresponding to the solution identifier;
   searching local memory for the special name; and
   installing a solution found in a folder having the special name, wherein the solution identifier is a URL.

5. A computer-implemented method comprising:
   receiving input to open a data file;
   discovering a solution identifier in the data file;
   computing a special name corresponding to the solution identifier;
   searching local memory for the special name; and
   installing a solution found in a folder having the special name, wherein the solution identifier is a URN.

6. A computer-implemented method comprising:
   receiving input to open a data file;
   discovering a solution identifier in the data file;
   computing a special name corresponding to the solution identifier;

searching local memory for the special name; and installing a solution found in a folder having the special name, wherein the local memory is a cache.

7. A computer-implemented method comprising:

receiving input to open a data file;

discovering a solution identifier in the data file;

computing a special name corresponding to the solution identifier;

searching local memory for the special name; and installing a solution found in a folder having the special name, wherein computing the special name is performed with a one-way hash.

8. The method of claim 7, wherein the one-way hash is an MD5 hash.

9. A system comprising:

a display having a screen capable of displaying icons or text representing a data file;

a user-input device capable of enabling a user to select the data file;

a network interface capable of communicating with a communications network to download a data file's solution application;

a computer capable of executing applications and communicating with a local memory source to store the data file's solution application; and a document manager application executable on the computer and configured to discover and deploy the data file's solution from the local memory source without user interaction.

10. The system of claim 9, wherein the document manager application is further capable of silently deploying the data file's solution within a sandbox.

* * * * *